Jan. 1, 1946. Q. BERG 2,391,872
DRIVER'S SEAT
Filed April 13, 1943 3 Sheets-Sheet 1

Inventor
Quentin Berg

Jan. 1, 1946.                Q. BERG                 2,391,872
                            DRIVER'S SEAT
                      Filed April 13, 1943      3 Sheets-Sheet 2

Inventor
Quentin Berg

By C.E. Herrstrom & H.E. Thibodeau
Attorneys

Jan. 1, 1946.　　　　　Q. BERG　　　　　2,391,872
DRIVER'S SEAT
Filed April 13, 1943　　　　3 Sheets-Sheet 3
FIG. 4
FIG. 3
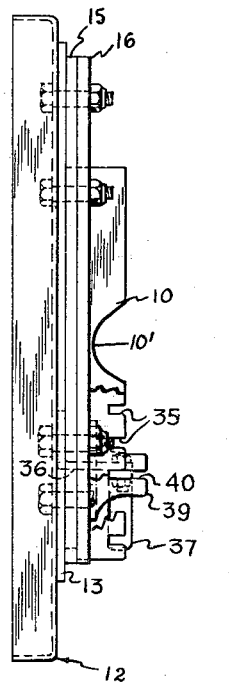
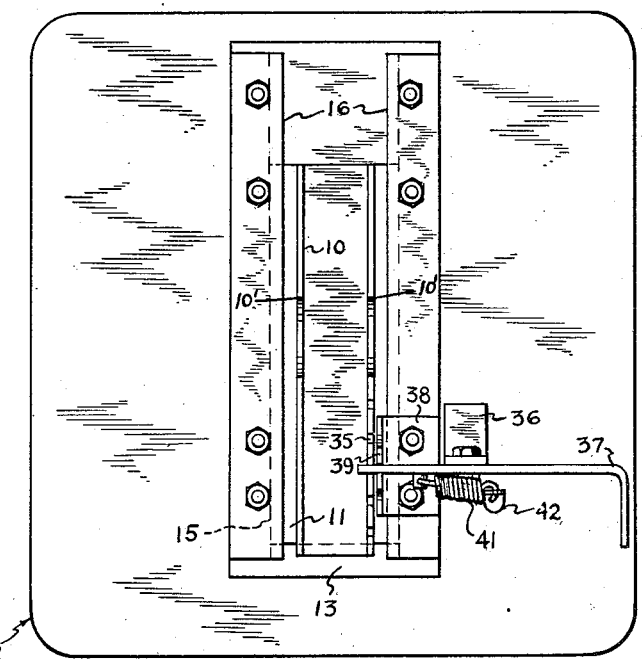
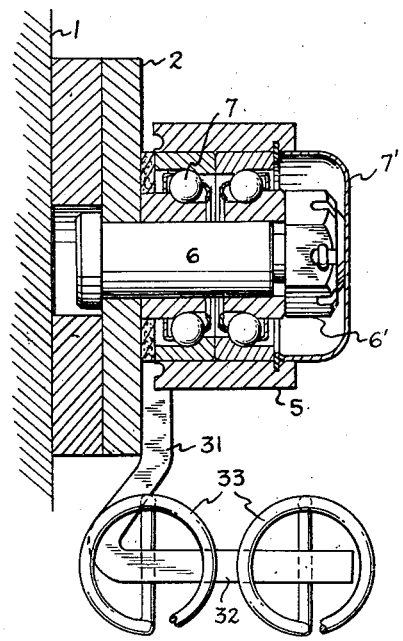
FIG. 5
INVENTOR
Quentin Berg
BY
C.E. Hernstrom & H.E. Thibodeau
ATTORNEYS Patented Jan. 1, 1946

2,391,872

UNITED STATES PATENT OFFICE 2,391,872

DRIVER'S SEAT

Quentin Berg, Detroit, Mich.

Application April 13, 1943, Serial No. 482,862

5 Claims. (Cl. 155—80)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel driver's seat for use particularly in a combat tank.

In such an installation, a mechanism is provided for adjusting the height of seat. This mechanism includes, in many instances, a parallelogram having one side fixed and the parallel side attached to the seat structure. The resulting parallel position of the seat in all adjustments is objectionable since it does not conform with the corresponding position of the driver's thighs as determined by the location of the control pedals. For example, in the uppermost position, the seat angle should be about 1½ degrees; in the lowest position the pedals cause the operator to form a larger angle at the knees, and a greater slope of the seat is therefore desirable in the lower positions.

The principal object of this invention is to increase the tilt of the seat in the lower positions progressively to about 15 degrees in the lowest position. An approximate parallelogram arrangement is used, and the desired object is accomplished by shortening one of its sides to produce a quadrilateral hereinafter referred to as an imperfect parallelogram. In the specific construction shown and described, the side carrying the moving seat structure is shorter than the opposite side of the parallelogram, while the adjacent sides thereof may be equal to each other. The same result may be obtained by shortening one of the latter sides while maintaining the equality of the sides adjacent thereto.

The seat is also capable of a sliding movement fore and aft, and heretofore the operator has been able to make the adjustment only by the friction between his clothing and the seat after bracing another part of his body against a nearby fixed member. According to the invention, the movable seat structure carries a hand lever for locking the seat in the adjusted position, and this lever may be also used by the operator to shift the seat backward or forward after he has braced himself as previously set forth. The operator is thus able to control the seat movement and locking lever with his one free hand, whereas in previous constructions he was obbliged to use that hand on a stationary latch which was so constructed and located that it did not permit him to apply a pull or a push to it.

The invention is fully disclosed by way of example in the following description and in the accompanying drawings in which:

Figure 3 is a bottom plan view of the seat bottom and plate;

Figure 4 is a side elevation of Figure 3, partly broken away, and

Figure 5 is an enlarged section on the line 5—5 of Figure 2.

Reference to these views will now be made by use of like characters which are employed to designate corresponding parts throughout.

Figure 1:
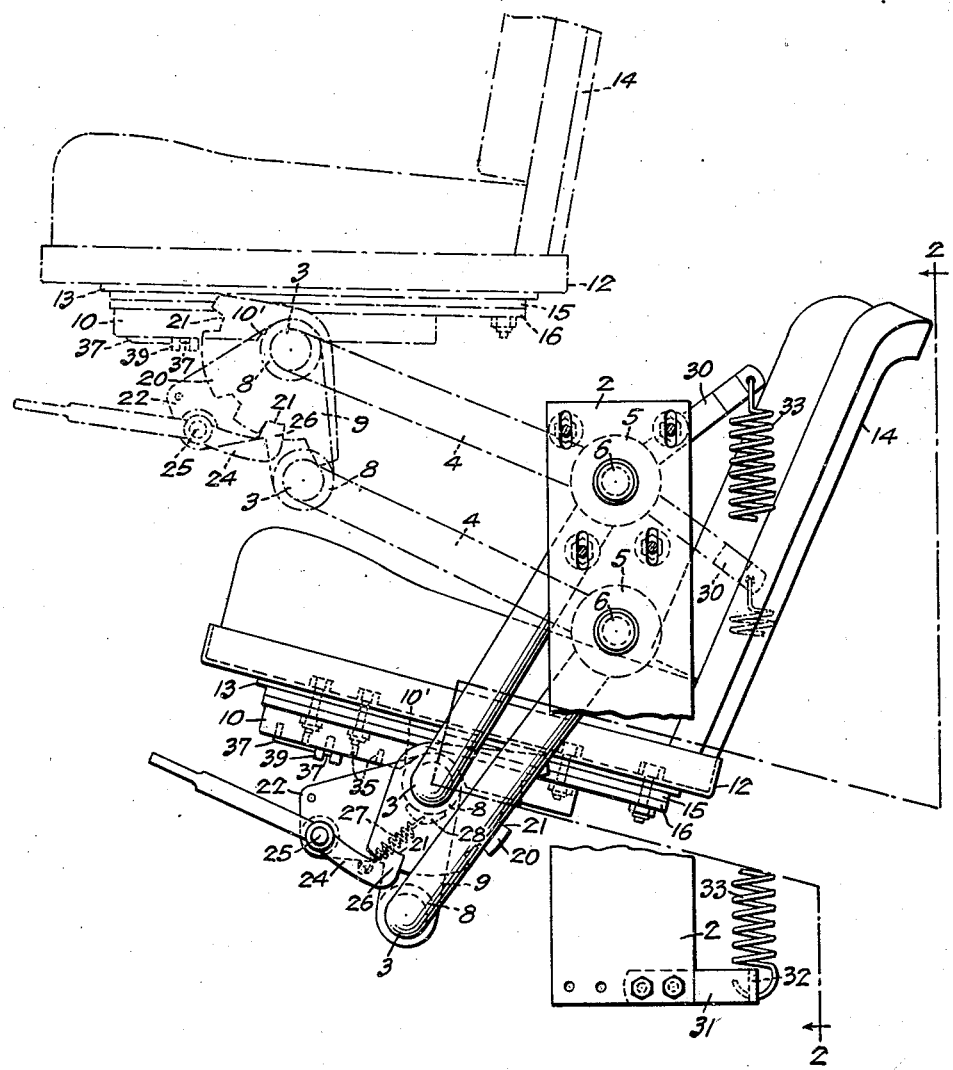
Figure 1 is a side elevation of the device.
Figure 2:
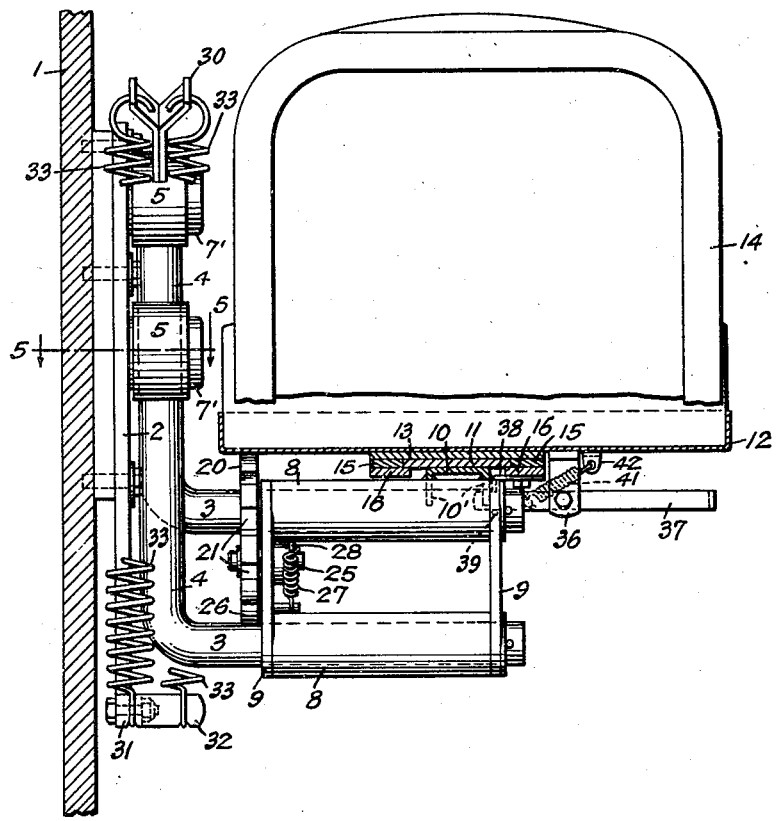
Figure 2 is a section on the line 2—2 of Figure 1.

The fixed structure of the tank may be represented by the wall 1 and an upright 2 secured to the wall or some other fixed part. The upright 2 supports a pair of angular rods, each comprising a horizontal portion 3 and an angularly related portion 4 adapted to swing in a vertical plane. The attachment is made by means of a bearing boss or eye 5 on the inner end of the portion 4 surrounding a stud 6 secured in the member 2, with ball bearings 7 interposed and retained by an assembly nut 6' covered by a cap 7'. The seat, which will presently be described, is supported by a tube 8 in which the portion 3 is adapted to rotate. The ends of the tubes 8 are joined by links 9 welded or otherwise secured thereto and thus form a rigid quadrilateral frame structure. On the upper tube is mounted and secured by any suitable means such as welding, an inverted channel 10 having recesses 10' to receive the tube as shown in Figures 1, 3 and 4. Upon the top of this channel is secured a horizontal seat-supporting plate 11.

The driver's seat 12 has a slide plate 13 secured to its bottom, resting upon and overlapping the supporting plate 11. The seat also has the usual back rest 14. Along the longitudinal edges of the plate 13 are secured guide strips 15 confining the plate 11, and to the guide strips are fastened retaining strips 16 overlapping the longitudinal edges of the plate 11. Thus the seat is guided by the members 15 and 16 in sliding along the relatively stationary supporting plate 11.

The center distance between the studs 6 is slightly greater than the center distance between the portions 3 in the links 9. The portions 4 are of equal length, and the quadrilateral thus formed will be termed an imperfect parallelogram. The line between studs 6 is obviously fixed, but the displaceable line between the centers of the portions 3 does not ordinarily have a parallel relation to the first line. The rigid structure 8, 9 follows the angular position of the line between the centers of portion 3; and, since the rigid structure carries the seat through the members 10 and 11, the angular position of the seat also changes as the rods 4, 4 are adjusted rotatably about their ball bearings 7. The means for rotating the rods and thus changing the elevation of the seat will presently be described, but for the present it may be stated that the dimensions of the imperfect parallelogram are such that the seat moves from a substantially horizontal position to a position approximately 15 degrees from the horizontal position. It will be evident that tilting of the seat can be obtained by shortening the upper or the lower arm 4. To one of the portions 3, preferably the upper one, is secured a vertically disposed sector 20 having notches 21. The inner link 9 carries a wing 22 to which is pivotally attached a latch 24 by a pin 25, having a hooked end 26 that will enter one of the notches 21. It may be noted here that the sector 20 is affixed to one of the rotary portions 3, while the latch 24 is mounted on the rigid frame 8, 9 in which the aforesaid portion 3 may rotate. It is also noted that the imperfect parallelogram cannot alter its position while the aforesaid portion 3 is locked against rotation relatively to the frame 8, 9, 22. The latch 24 is held in an engaged position by a spring 27 connecting its hooked side to a lug 28 formed on the upper sleeve 8.

For shifting the parallelogramic frame when the sector 20 is released, a bifurcated member 30 is secured to one of the bosses 5, preferably the upper one, and extends radially outward therefrom. An angle bracket 31 is fastened to the lower end of the plate 2, extending rearwardly of the seat, and has a transverse horizontal leg 32 lying beneath the member 30. A pair of springs 33 connect the prongs of the member 30 to the leg 32, exerting a downward pull on the member 30 and an upward force on the portions 4 to raise the seat when the latch 24 is disengaged from the sector 20.

The slidability of the seat on the plate 11 has already been mentioned. In order to lock the seat in the adjusted position, one of the sides of the inverted channel 10 is notched at 35, and a latch for reception in the notches is carried by the seat. For this purpose an angle bracket 36 is secured to the bottom of the seat, and to the bracket is pivotally attached a latch bar 37 lying transversely of the seat and adapted for reception in any one of the notches 35 as clearly shown in Figure 3. In order to guide the locking end of the latch and to take some of the stress, another angle bracket 38 is secured to the bottom of the seat alongside the notched portion of the channel 10, with its depending portion 39 parallel to this part of the channel and slotted at 40 to receive the latch as shown in Figure 4. The latch is normally held in an engaged position by a coil spring 41 connecting its locking side to a small bracket 42 on the bottom of the seat.

In sliding the seat, the operator must obviously release the latch with one hand. Another part of his body, either his other hand or a foot, is braced against a fixed part of the vehicle. The operator is thus able to use the hand on the latch for shifting the seat rather than relying on the friction between his clothing and the seat, especially in moving the seat forward. The stress on the latch in this operation is taken up in the slot 40 as previously stated.

Although a specific embodiment of the invention has been illustrated and described, it will be understood that various alterations in the details of construction may be made without departing from the scope of the invention as indicated by the appended claims.

What I claim is:

1. In a seat construction, a fixed supporting member, a pair of rods each having one end pivotally mounted on said member in vertically spaced relation to each other, a horizontal angular extension from the remaining end of each rod, a rigid frame loosely mounted on said extensions to permit turning of said extensions therein, a seat supported on said frame, the quadrilateral formed by said rods, said frame and the distance between the pivotally mounted ends of said rods being an imperfect parallelogram, and means for locking at least one of the articulations of said parallelogram.

2. In a seat construction, a fixed supporting member, a pair of rods each having one end pivotally mounted on said member in vertically spaced relation to each other, a horizontal angular extension from the remaining end of each rod, a rigid frame loosely mounted on said extension to permit turning of said extensions therein, a seat supported on said frame, the distance between said extensions as determined by said frame being less than the distance between the pivotally mounted ends of said rods to form an articulated imperfect parallelogram, and means for locking at least one of the articulations of said parallelogram.

3. In a seat construction, a fixed supporting member, a quadrilateral frame hinged together at the vertices and having a fixed side comprised in said member, a seat mounted to exert its weight on the quadrilateral at a distance from said fixed side, one of the sides of said frame being unequal to the opposite side and the remaining sides being equal to each other, a toothed sector connected to one of said remaining sides, a supporting piece connected to said opposite side, and a latch pivotally mounted on said piece and engageable with said sector.

4. In a seat construction, a fixed supporting member, a pair of rods each having one end pivotally mounted on said member in vertically spaced relation, a horizontal angular extension from the remaining end of each rod, a rigid frame loosely mounted on said extensions to permit turning of said rods therein, a seat supported on said frame, the quadrilateral formed by said rods, said frame and the distance between the pivotally mounted ends of said rods being an imperfect parallelogram, a toothed sector connected to one of said extensions, a supporting piece connected to said frame, and a latch pivotally mounted on said piece and engageable with said sector.

5. In a seat construction, a fixed supporting member, a pair of rods each having one end pivotally mounted on said member in vertically spaced relation, a horizontal angular extension from the remaining end of each rod, a rigid frame loosely mounted on said extensions to permit turning of said rods therein, the quadrilateral formed by said rods, said frame and the distance between the pivotally mounted ends of said rods being an imperfect parallelogram, means for locking at least one of the articulations of said parallelogram, a track carried by said frame, a seat slidably mounted on said track, a rack carried by said track, and a latch bar pivotally carried by said seat and engageable with said rack.

QUENTIN BERG.